United States Patent
Hosoi et al.

[11] Patent Number: 5,816,112
[45] Date of Patent: Oct. 6, 1998

[54] STEERING WHEEL

[75] Inventors: Akio Hosoi, Komaki; Atsushi Nagata, Inazawa; Tooru Koyama, Nishikasugai-gun, all of Japan

[73] Assignee: Toyoda Gosei Co. Ltd., Aichi-ken, Japan

[21] Appl. No.: 745,789

[22] Filed: Nov. 8, 1996

[30] Foreign Application Priority Data

Nov. 10, 1995 [JP] Japan .................................. 7-292797

[51] Int. Cl.⁶ ...................................................... B62D 1/04
[52] U.S. Cl. ............................................. 74/552; 403/359
[58] Field of Search ...................................... 403/299, 359, 403/362; 74/552

[56] References Cited

U.S. PATENT DOCUMENTS 5,536,106  7/1996  Landis et al. .............................. 74/552
5,558,337  12/1996  Milton ....................................... 74/552

FOREIGN PATENT DOCUMENTS 000475183  8/1991  European Pat. Off. .................. 74/552
3535-768-A  4/1986  Germany .................................. 74/552
2-133955  11/1990  Japan .

Primary Examiner—Charles A. Marmor
Assistant Examiner—Ankur Parekh
Attorney, Agent, or Firm—Pillsbury Madison & Sutro LLP Intellectual Property Group

[57] ABSTRACT

A steering wheel assembly having a slidably mounted locking system of the boss plate to connect the steering wheel onto a steering shaft. The lock system comprises a fixing device slidably mounted on an upper surface of a boss plate. The fixing device includes an inwardly directed, tapered tongue or flange that when slid will engage and interact with the steering shaft. When the boss plate is mounted on the steering shaft provided about the circumference of a nut mounted on the steering shaft, the fixing device can then be moved with a screw bolt thereby interlocking the locking tongue or flange in the groove thereby locking the steering wheel on the steering shaft.

6 Claims, 6 Drawing Sheets

STEERING WHEEL

The following priority application, Japanese Patent Application No. hei 7-292797, filed in Japan on Nov. 10, 1995, is hereby incorporated by reference into the present specification.

BACKGROUND OF THE INVENTION

1. Field of the Invention

This invention relates to a steering wheel, and more particularly to a steering wheel mounting structure.

2. Description of Related Art

A conventional steering wheel comprises a ring portion, a pad portion located at the center of the ring portion, and spoke portions that interconnect the ring and pad portions. The ring portion has a ring core and the spoke portions have spoke cores. The ring core and spoke cores are conventionally covered with a molded covering material such as polyurethane. The spoke cores are connected with a boss which is, in turn, connected to a steering shaft.

It has been suggested that a steering wheel can be formed with an integral pad and covering portion, for example, as shown in Japanese utility model laid open No. hei 2-133955.

Manufacturers prefer to use steering wheels with an integrally formed pad and covering portion, so that the look, styling and design of the steering wheel is improved.

However, this type of integrally formed steering wheel is difficult to mount on the steering shaft since the steering wheel cannot be removed or separated from the pad and the covering portion. Therefore, when the boss plate is connected to spoke cores, it is difficult to fasten a nut to the boss plate from above.

Therefore, it is desirable to have a steering wheel that is easily and securely mounted on a steering shaft by a convenient connection between a boss plate and the spoke cores.

SUMMARY OF THE INVENTION

An object of the present invention is to provide a steering wheel, formed with an integral pad and a covering portion, which is mounted on a steering shaft easily and securely.

A steering wheel according to the present invention comprises a steering wheel main body and a boss plate for connection to a steering shaft. The steering wheel main body has a cover portion, an embedded ring core and spoke cores, and an integrally formed pad portion. the boss plate is connected on the steering shaft with a nut and a fixing device. The nut has a sloped or tapered surface which becomes bigger toward the outer diameter of the nut. The fixing device is a cross-sectional wedge shape that will interfit with the tapered surface of the nut.

The nut is mounted on the end of the steering shaft but will be at a common upper level with the top surface of the boss plate. Then, the fixing device can move across the boss plate's upper surface and into engagement with the tapered surface on the nut.

Therefore, the boss plate is easily mounted on the steering shaft and the steering wheel is prevented from coming off and rattling since the fixing device is pushed between the nut and the boss plate. The steering wheel is positively mounted on the steering shaft. Significantly, the mounting of the steering wheel can be accomplished from the surrounding space of the steering shaft because the fixing device is moved horizontally between the nut and the boss plate. The steering wheel is easily mounted on the steering shaft without the nut connected to the steering wheel from an upper side of the boss plate.

Other objects, features, and characteristics of the invention will become apparent upon consideration of the following description and the appended claims with reference to the accompanying drawings, all of which form a part of this specification.

DETAILED DESCRIPTION OF THE PREFERRED EMBODIMENT

Figure 1:
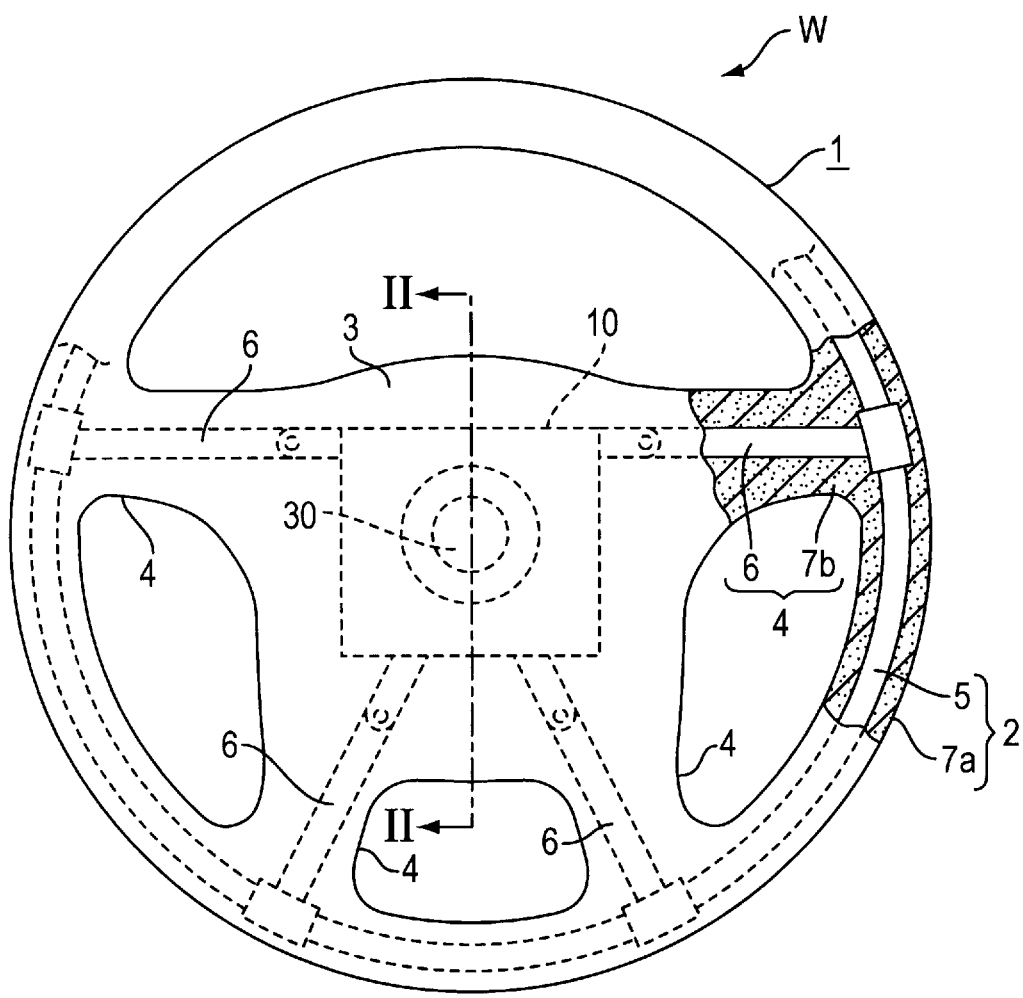
FIG. 1 is an elevation of a steering wheel.

As shown in FIG. 1, the steering wheel main body 1 comprises a ring portion 2, a pad 3, located at the center of the ring portion 2, and four spoke portions 4 interconnecting the ring portion 2 and the pad 3. Ring portion 2 includes a ring core 5 made, for example, of a steel tube, and a cover layer 7a. Each spoke portion 4 has a separate spoke core 6, for example made of aluminum tubing, that is suitably connected to ring core 5. A covering layer 7b covers each of the spoke cores 6. The cover layers 7a and 7b and the pad 3 are preferably made, for example, of relatively soft, sponge type polyurethane.

Figure 2:
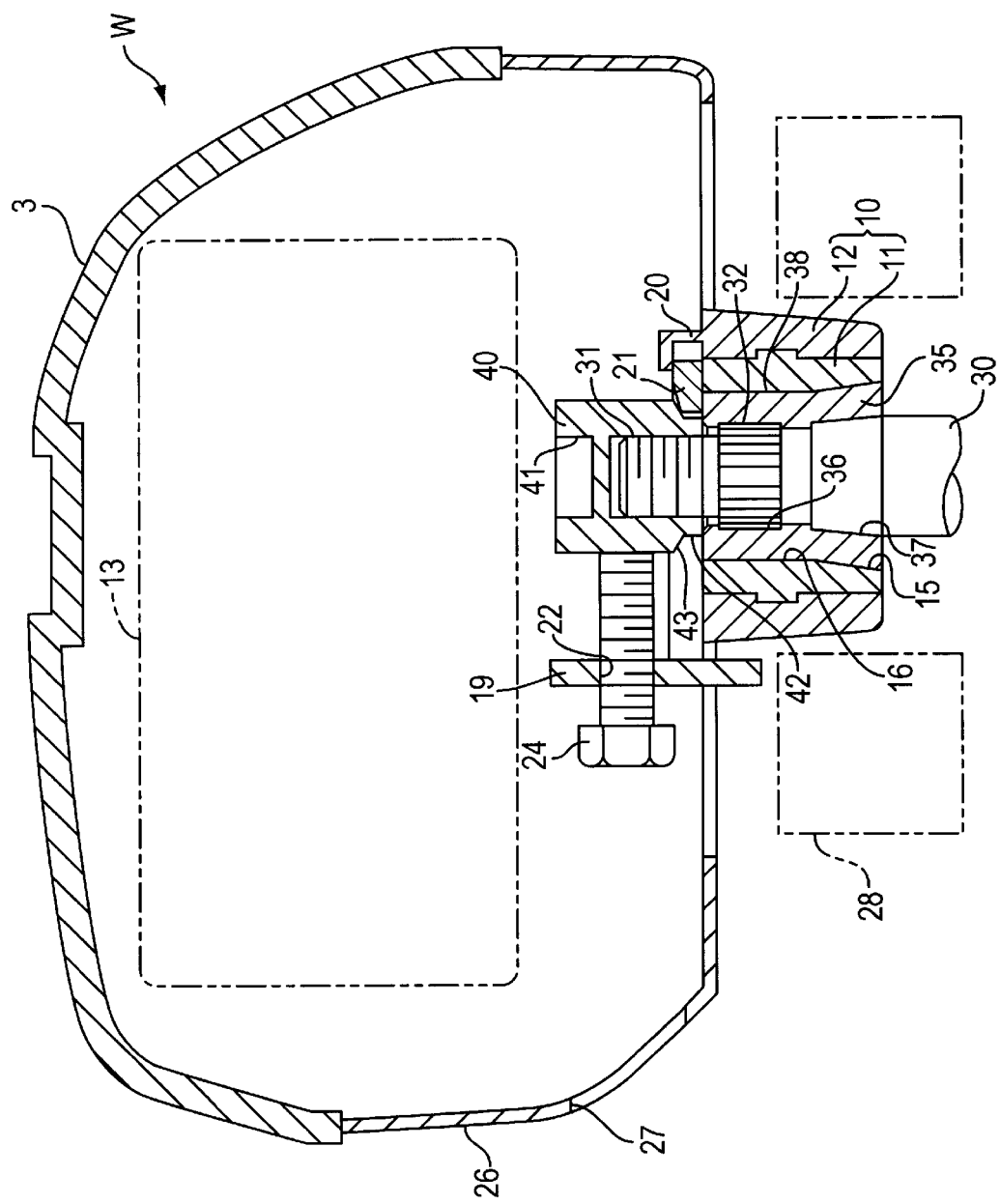
FIG. 2 is a cross-sectional view of a first embodiment of the steering wheel, taken along line 2—2 of FIG. 1.

The spoke cores 6 extend inwardly from the ring core 5 with their inward end being connected to a boss plate 10 that is itself connected on a steering shaft 30. The boss plate 10 is located under the pad 3 as shown in FIG. 2 and includes an interior cylindrical portion 11, preferably made of steel, and an outer cylindrical portion 12, preferably made of aluminum, enclosing the interior portion 11. A conventional air bag device 13 is mounted under the pad 3. The air bag device 13 includes a folded bag and an inflator (not shown) for generating the necessary gas.

Figure 3:
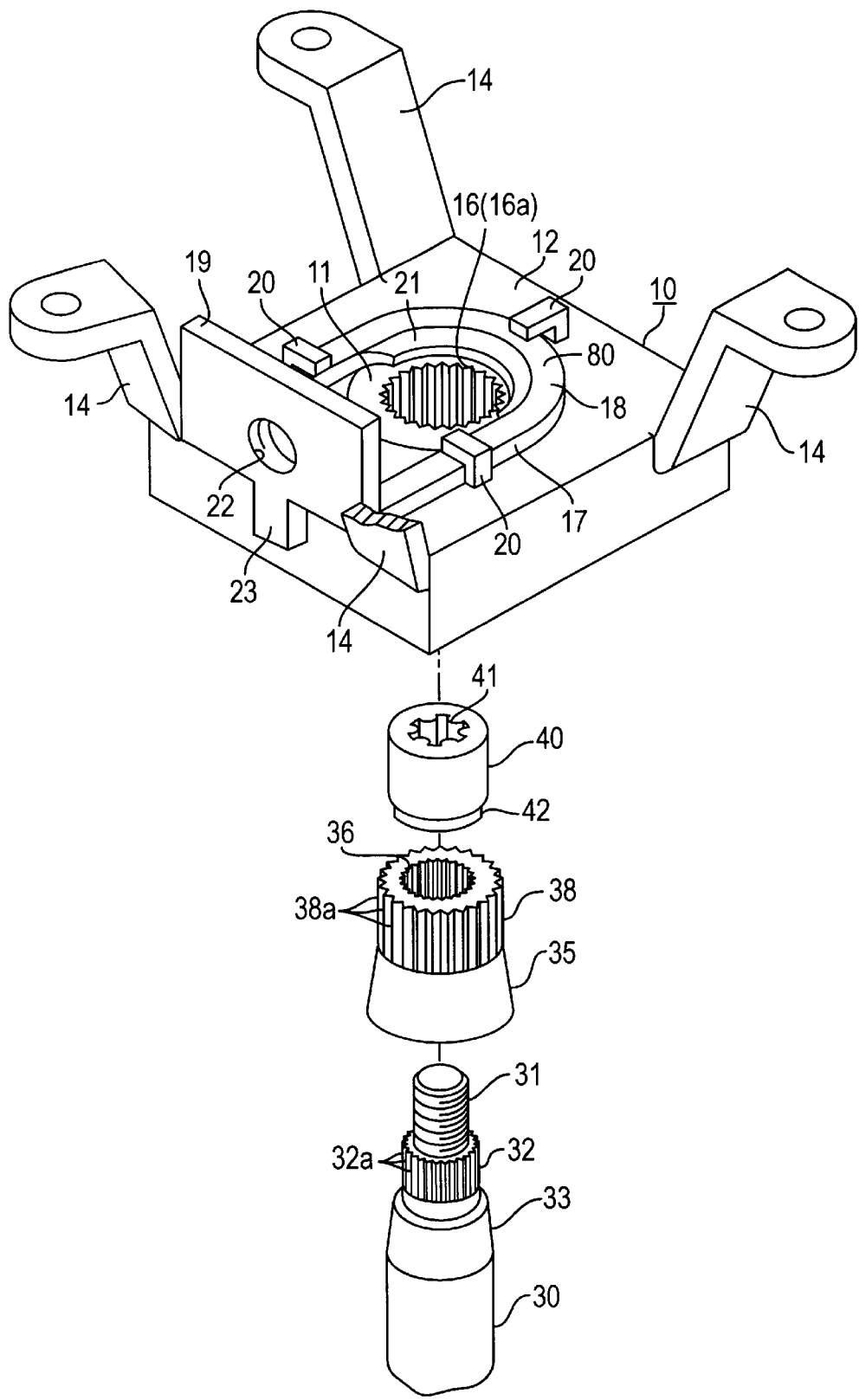
FIG. 3 is an exploded view of a boss plate and surroundings of the boss plate.

As shown in FIGS. 2 and 3, the steering shaft 30 has a threaded portion 31 located at the top end, a serrated portion 32 located under the threaded portion 31, and a tapered surface 33 located under the serrated portion 32. The serrated portion 32 can have, for example, about 30 teeth 32a. An adaptor 35 is attached at the serrated portion 32 and the tapered portion 32 is fixed to the steering shaft 30 with a nut 40 which is screwed onto the threaded portion 31.

The inside surface of the adapter 35 has an inner serrated portion 36 corresponding to the serrated portion 32 of the steering shaft 30 and a tapered surface 37 corresponding to the tapered surface 33 of the steering shaft 30. The outside surface of the adapter 35 also has an outer serrated portion 38 that extends along the upper half of the adapter 35. The outer serrated portion 38 can, for example, have about sixty teeth, which is more than the number of teeth included on the serrated portion 32 of the steering shaft 30.

The nut 40 has a substantially cylindrical outer shape. The upper interior of nut 40 is provided with a star shaped groove or socket that can receive a suitable closing tool or wrench. As further shown in FIG. 4, a small diameter portion 42 is formed at the lower part of the nut 40 and has a smaller diameter than the upper part of nut 40. A tapered surface 43 is formed at the juncture of the small diameter portion 42 and the upper part of nut 40.

Figure 4:
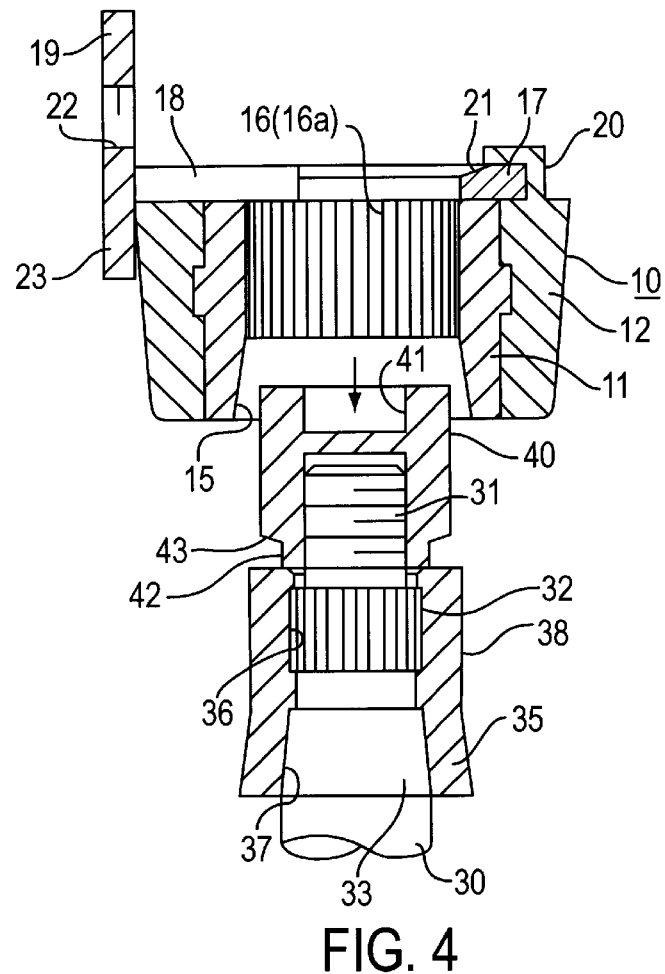
FIG. 4 is a cross-sectional view of a mounting process of the steering wheel.
Figure 5:
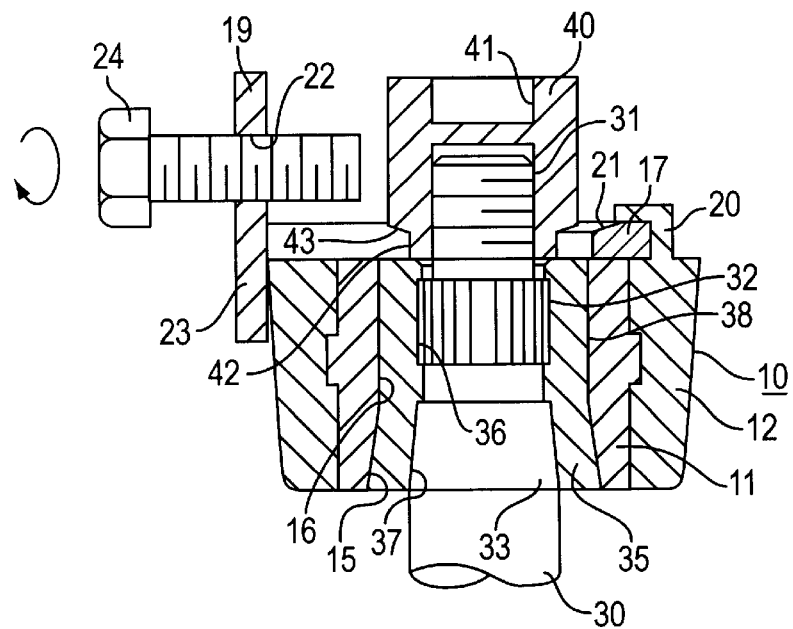
FIG. 5 is a cross-sectional view of other mounting process of the steering wheel.

As shown in FIGS. 2, 3 and 4, after the adapter 35 is inserted into the end of steering shaft 30, nut 40 is screwed onto the threaded portion 31 of the steering shaft that extends above adapter 35. Then, the boss plate 10 is inserted over the adapter 35 such that the outer serrated portion 38 interfits and meshes with serrated portion 16. At this time, the upper surface of the adapter 35 is at substantially the same height as the upper surface of boss plate 10 as shown in FIGS. 2 and 5.

The boss plate 10 includes an interior portion 11 and an outer portion 12 as in FIG. 2. The outer portion 12 has four arm portions 14 connected at each of four corners. The arm portions 14 extend upwardly from the upper surface and are connected to each of the spoke cores 6. The interior portion 11 includes a central bore 15 having an interior surface that includes vertical serrations 16 at the upper part of bore 15. The serrated portion 16 corresponds to the outer serrated portion 38 of the adapter 35. The number of the serrated portion's teeth are the same as the outer serrated portion and will mesh therewith.

A fixing device 17 is mounted on the upper surface of boss plate 10 as in FIG. 3. The fixing device 17 is supported with three supports 20. The boss plate 10 is fixed to the steering shaft 30, the adapter 35 and the nut 40 with the fixing device 17.

Figure 7:
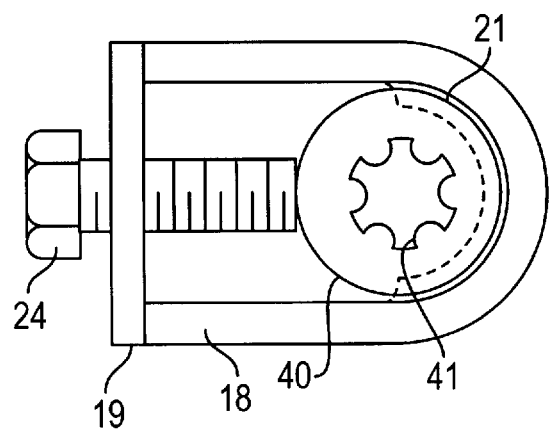
FIG. 7 is an elevational view of FIG. 6.

The fixing device 17 comprises a U-shaped base portion 18, the two legs of which are attached to a plate portion 19 as shown in FIG. 7. The U-shaped base portion 18 has an upper surface, the outer portion 80 being substantially flat whereas the inner portion 21 is tapered. This produces a cross-sectional wedge shape which is gradually tapered toward the inner side adjacent central bore 15. The plate portion 19 has a bolt hole 22 and a projection 23.

As shown in FIG. 2, a lower part 26 of the outer cover closes a lower opening of the pad 3. The lower cover 26 itself has an opening 27 that will permit a screwdriver or other tool to be inserted into the lower cover 26. A spiral cable 28 is located around the steering shaft 30 and under the lower cover 26. The spiral cable 28 is connected between the air bag device 13 and a conventional sensor (not shown).

The steering wheel is mounted to the steering shaft 30 as follows. As a first step, the steering wheel main body 1 will have been attached to the air bag device 13 along with a convention membrane switch (not shown in the Figures). Also, the boss plate 10 will have been fixed to the spoke cores 6.

Then, as shown in FIG. 4, the adapter 35 is positioned on the top of the steering shaft 30 and the nut 40 is screwed onto the screw portion 31 of the steering shaft 30. Relative rotation between the adapter 35 and shaft 30 is prevented because of the interfitting serrated portion 32 with serrated portion 36. The adapter 35 is fixed vertically on the steering shaft 30 by nut 40.

Thereafter, boss plate 10 is mounted to the steering shaft 30 with the serrated portion 16 of hole 15 being mounted to the outer serrated portion 38. This will also serve to correctly position the steering wheel after mounting. As shown in FIG. 5, when the boss plate 10 is mounted to the steering shaft 30, the nut 40 will project through the upper surface of boss plate 10, but the upper surface of adapter 35 will be substantially equal to or at the same level as the upper surface of boss plate 10.

Figure 6:
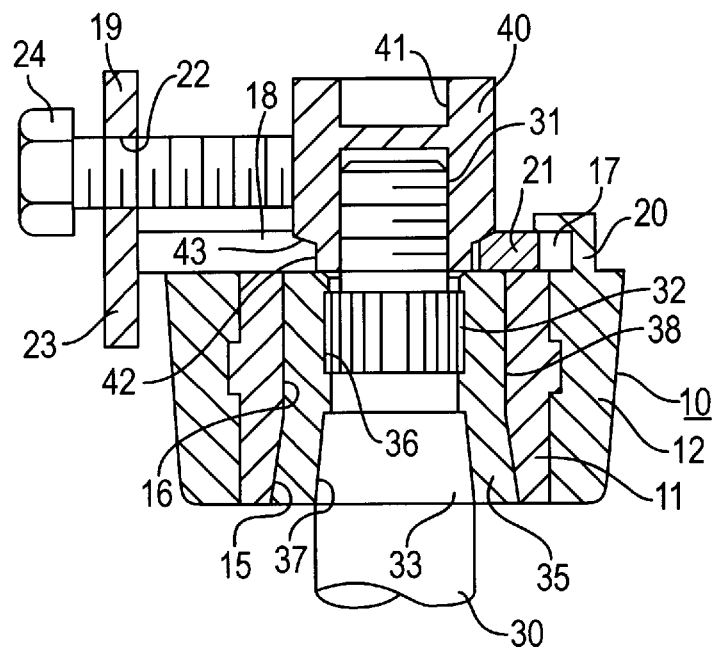
FIG. 6 is a cross-sectional view of other mounting process of the steering wheel.

Then, bolt 24 is screwed into the screw hole 22 in plate portion 19. As bolt 24 is screwed further after touching nut 40, the fixing device 17 will be moved in a direction toward the left side in FIGS. 6 and 7 as plate 19 is moved away from nut 40. This movement causes the tapered surface 21 of the base portion 18 to be pushed up against and beneath the tapered surface 43 of nut 40. As a result, the base portion 18 of the fixing device 17 is structurally interfitted between both the adapter 35 and the boss plate 10. Also, the base portion 18 becomes a wedge between the adapter 35 and the nut 40.

Therefore, the boss plate 10 is positively fixed on the steering shaft 30. When the steering wheel is mounted on the steering shaft 30, a tightening tool, for turning the bolt 24, can be inserted into the steering wheel main body 1 from the right angle direction of the steering shaft 30. As a result, the steering wheel, which is integrally formed with the pad 3, the ring portion 2 and the spoke portions 4 will all have been mounted on the steering shaft 30 in an easy and positive manner.

In addition, this type of connection between the boss plate 10 and the steering shaft 30 will not interfere with the operation of the spiral cable 28, shown in FIG. 2, which provides an electrical connection to the air bag device 13. The spiral cable 28 is located outside of the steering shaft 30, so that the steering wheel can be easily mounted on the steering shaft 30 without any effect on the spiral cable 28.

Furthermore, if the boss plate 10 has different number of serrated teeth, relative to the number of teeth on the steering shaft, such a boss plate 10 can be mounted on the steeling shaft 30 by simply changing the adapter 35. Therefore, even if a variety of types of steering wheels are employed, such different parts can be easily accommodated at a reduction in cost since only a variety of adapters need be stocked. The increasing number of teeth of the serrated portion 16 and the outer serrated portion 38 can also be accurately adjusted.

Figure 8:
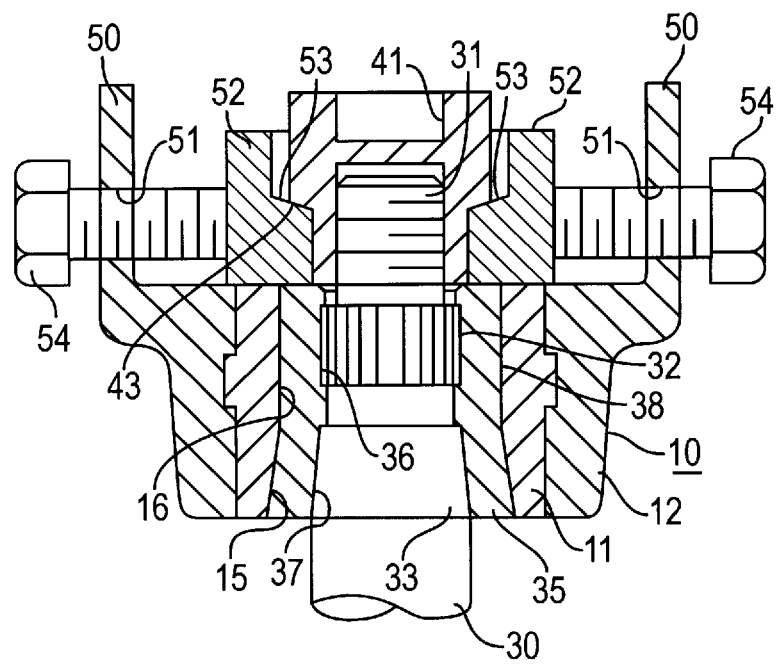
FIG. 8 is a cross-sectional view of a second embodiment of a boss plate and surroundings of the boss plate.
Figure 9:
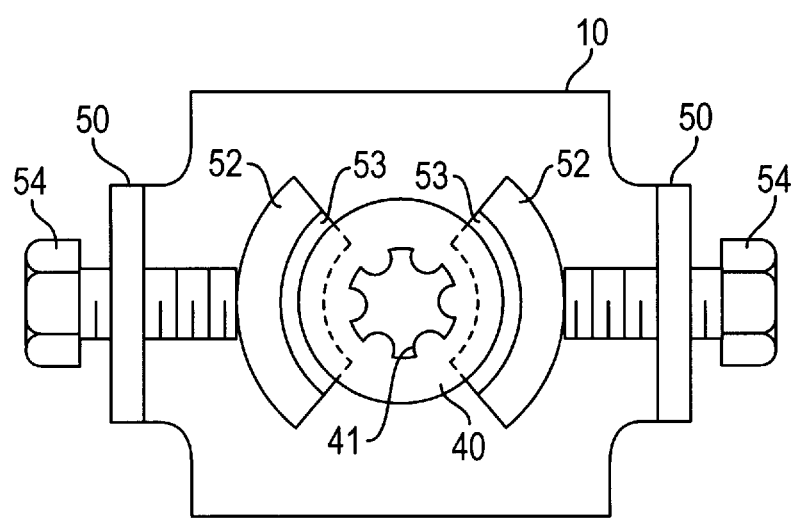
FIG. 9 is an elevational view of FIG. 8.

A second embodiment of this invention is shown in FIGS. 8 and 9. The number of the parts is substantially similar to the first embodiment and the differences between the first embodiment and the second embodiment follows.

The boss plate 10 has a pair of projection plates 50 at opposite sides of the boss plate 10. Each plate 50 has a screw hole 51. A fixing device 52 has an arc shape and includes a tapered surface 53 extending along the inside of the arc. A fixing device 52 is located on each side of nut 40. The outside surface of each fixing device 52 lies in contact with the tip of a bolt 54 that threadedly engages each plate 50. The tapered surface 43 of the nut 40 is also in contact with the tapered surface 53 of the fixing device 52.

After the steering wheel is mounted on the steering shaft 30, each fixing device 52 will be pushed toward the center axis of the steering shaft 30 as bolt 54 is screwed inwardly. As a result, the tapered surface 43 will contact and slidingly engage the tapered surface 53, thereby pushing nut 40 upwardly.

Therefore, the steering wheel is prevented from getting loose or wobbly, or from coming off because nut 40 and the steering shaft 30 are pushed up against the boss plate 10.

Another embodiment of this invention would be to use an energy absorbing device, instead of air bag device 38, in the steering wheel main body 1.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A steering wheel mounting structure cooperating with a steering shaft comprising:

a main body including a ring portion, a plurality of spoke portions and a pad; said pad being located at the center of said ring portion and integrally formed with said spoke portions; and a boss plate having a fixing device slidably mounted thereon, said fixing device having a first engaging portion;

said steering shaft having an adapter mounted on a top end of said shaft and a nut mounted on said shaft above said adapter, said nut having a second engaging portion that can mate and engage said first engaging portion thereby locking said nut and boss plate together.

2. The steering structure according to claim 1, wherein said first engaging portion is engaged by being pushed by a screw bolt.

3. A steering wheel assembly comprising:

a boss plate connected to a steering wheel main body and having a fixing device slidably mounted thereon and a locking device for positioning said fixing device; and a steering shaft having an adapter mounted on a top end of said shaft and a nut mounted on said shaft above said adapter, wherein a stopper portion is located on said adapter, wherein a groove is located on said nut;

wherein said stopper portion receives said boss plate; said groove receives said fixing device, and wherein said nut has a tapered surface for supplying said groove.

4. The steering wheel assembly according to claim 3, wherein said nut appears above an upper surface of said boss plate.

5. The steering wheel assembly according to claim 3, wherein said fixing device has a sloped surface corresponding to said tapered surface.

6. A steering wheel assembly comprising:

a boss plate connected to a steering wheel main body and having at least two fixing devices slidably mounted thereon and a locking device for positioning said fixing devices; and a steering shaft having an adapter mounted on a top end of said shaft and a nut mounted on said shaft above said adapter, wherein a stopper portion is located on said adapter, wherein a groove is located on said nut;

wherein said stopper portion receives said boss plate; said groove receives said fixing devices, and wherein said at least two fixing devices are positioned on opposite sides of said steering shaft and face each other.

* * * * *